(12) United States Patent  
Ikeda et al.

(10) Patent No.: US 8,212,978 B2
(45) Date of Patent: Jul. 3, 2012

(54) LIQUID CRYSTAL APPARATUS AND ELECTRONIC APPARATUS

(75) Inventors: Kojiro Ikeda, Tottori (JP); Tomoaki Sekime, Azumino (JP)

(73) Assignee: Sony Corporation, Tokyo (JP)

( * ) Notice: Subject to any disclaimer, the term of this patent is extended or adjusted under 35 U.S.C. 154(b) by 629 days.

(21) Appl. No.: 12/338,290

(22) Filed: Dec. 18, 2008

(65) Prior Publication Data

US 2009/0207354 A1 Aug. 20, 2009

(30) Foreign Application Priority Data

Feb. 15, 2008 (JP) ................. 2008-034073

(51) Int. Cl.
*G02F 1/1335* (2006.01)

(52) U.S. Cl. ........................................ 349/118

(58) Field of Classification Search .............. None
See application file for complete search history.

(56) References Cited

U.S. PATENT DOCUMENTS

| 5,883,685 A * | 3/1999 | Mazaki et al. ............. 349/117 |
| 6,476,891 B1 * | 11/2002 | Shibazaki et al. ........... 349/117 |
| 2007/0091236 A1 * | 4/2007 | Yano et al. ................. 349/117 |

FOREIGN PATENT DOCUMENTS

JP A-2004-157523 6/2004

* cited by examiner

*Primary Examiner* — Lucy Chien

(74) *Attorney, Agent, or Firm* — K&L Gates LLP

(57) ABSTRACT

A liquid crystal apparatus includes: a liquid crystal panel having a pair of substrates; a liquid crystal layer arranged between the pair of substrates and driven by an electric field having a component parallel to the substrates; a first polarizing plate and a second polarizing plate arranged with the liquid crystal panel interposed therebetween; and a retardation film arranged between the first polarizing plate and the liquid crystal panel or between the second polarizing plate and the liquid crystal panel, in which the first polarizing plate and the second polarizing plate each include a polarizer and translucent protection films which interpose the polarizer, an in-plane phase difference $Re_1$ of the protection film satisfies 0 nm$\leq Re_1 \leq$5 nm, a thickness direction phase difference Rth of the protection film satisfies 0 nm$\leq$Rth$\leq$20 nm, an in-plane phase difference $Re_2$ of the retardation film satisfies 200 nm$\leq Re_2 \leq$300 nm, an Nz value of the retardation film satisfies 0.4$<$Nz$\leq$0.8, and an average refractive ratio Nave of the retardation film satisfies 1.4$\leq$Nave$\leq$2.0.

8 Claims, 10 Drawing Sheets

LIQUID CRYSTAL APPARATUS AND ELECTRONIC APPARATUS

BACKGROUND

1. Technical Field

An aspect of the present invention relates to a liquid crystal apparatus and an electronic apparatus.

2. Related Art

Liquid crystal apparatuses are generally configured to include a pair of substrates and a liquid crystal panel having a liquid crystal layer encapsulated between these substrates, and also a polarizing plate on the outside the liquid crystal panel. From among these liquid crystal apparatuses, the liquid crystal apparatuses of an IPS (In-Plane Switching) mode and an FFS (Fringe Field Switching) Mode in which the liquid crystal layer is driven by an electric field extending in parallel with the substrate (lateral electric field) are known. In the liquid crystal apparatuses of a lateral electric field system, a configuration in which a retardation film is arranged between the liquid crystal panel and the polarizing plate for widening an angle of visibility is known. In particular, in JP-A-2004-157523, conditions of the retardation film in which the phase difference of transparent protection films included in the polarizing plate is considered are proposed.

However, in the compensation conditions in the related art including JP-A-2004-157523, the average refractive index of the retardation film is not considered and there is a problem that the wide angle of visibility might not be obtained depending on the average refractive index of the retardation film.

SUMMARY

An advantage of some aspects of the invention is realized by the following modes or examples.

A liquid crystal apparatus includes: a liquid crystal panel having a pair of substrates and a liquid crystal layer arranged between the pair of substrates and driven by an electric field having a component parallel to the substrates; a first polarizing plate and a second polarizing plate arranged with the liquid crystal panel interposed therebetween; and a retardation film arranged between the first polarizing plate and the liquid crystal panel or between the second polarizing plate and the liquid crystal panel, in which the first polarizing plate and the second polarizing plate each include polarizer and translucent protection films which interpose the polarizer, an in-plane phase difference $Re_1$ of the protection film satisfies 0 nm$\leq Re_1 \leq$5 nm, a thickness direction phase difference Rth of the protection film satisfies 0 nm$\leq$Rth$\leq$20 nm, an in-plane phase difference $Re_2$ of the retardation film satisfies 200 nm$\leq Re_2 \leq$300 nm, an Nz value of the retardation film satisfies 0.4<Nz$\leq$0.8, and an average refractive ratio Nave of the retardation film satisfies 1.4$\leq$Nave$\leq$2.0.

In this configuration, by selecting the in-plane phase difference $Re_2$, the Nz value, and the average refractive ratio Nave of the retardation film adequately, a liquid crystal apparatus in which the in-plane phase difference $Re_1$ and the thickness direction phase difference Rth of the protection film are compensated to achieve a display having a high-contrast ratio over a wide angular range (that is, with a wide angle of visibility) is obtained.

In this specification, the in-plane phase difference $Re_1$ of the protection film is represented by $Re_1=(nx_1-ny_1)d_1$, where the direction in which the in-plane refractive index of the protection film becomes maximum is x-axis, the direction parallel to the plane of the protection film and vertical to the x-axis is y-axis, and the direction of thickness of the protection film is z-axis, the refractive indices in 550 nm in the respective axial directions are $nx_1$, $ny_1$, and $nz_1$, and the thickness of the protection film is $d_1$. The thickness direction phase difference Rth of the protection film is represented by Rth=$\{(nx_1+ny_1)/2-nz_1\}d_1$. In contrast, the in-plane phase difference $Re_2$ of the retardation film is represented by $Re_2=(nx_2-ny_2)d_2$, where the direction in which the in-plane refractive index of the retardation film becomes maximum is x-axis, the direction parallel to the planes of the retardation film and vertical to the x-axis is y-axis, and the direction of thickness of the retardation film is z-axis, the refractive indices in 550 nm in the respective axial directions are $nx_2$, $ny_2$, and $nz_2$, and the thickness of the retardation film is $d_2$. The Nz value of the retardation film is represented by Nz=$(nx_2-nz_2)/(nx_2-ny_2)$. The average refractive ratio Nave of the retardation film is represented by Nave=$(nx_2+ny_2+nz_2)/3$.

A liquid crystal apparatus includes: a liquid crystal panel having a pair of substrates; a liquid crystal layer arranged between the pair of substrates and driven by an electric field having a component parallel to the substrates; a first polarizing plate and a second polarizing plate arranged with the liquid crystal panel interposed therebetween; and a retardation film arranged between the first polarizing plate and the liquid crystal panel or between the second polarizing plate and the liquid crystal panel, in which the first polarizing plate and the second polarizing plate each include a polarizer and a translucent protection film which interpose the polarizer, an in-plane phase difference $Re_1$ of the protection film satisfies 0 nm$\leq Re_1 \leq$5 nm, a thickness direction phase difference Rth of the protection film satisfies 20 nm<Rth$\leq$40 nm, an in-plane phase difference $Re_2$ of the retardation film satisfies 100 nm$\leq Re_2 \leq$150 nm, an Nz value of the retardation film satisfies 0.2$\leq$Nz$\leq$0.4, and an average refractive ratio Nave of the retardation film satisfies 1.4$\leq$Nave$\leq$2.0.

In this configuration, by selecting the in-plane phase difference $Re_2$, the Nz value, and the average refractive ratio Nave of the retardation film adequately, a liquid crystal apparatus in which the in-plane phase difference $Re_1$ and the thickness direction phase difference Rth of the protection film are compensated to achieve a display having a high-contrast ratio over a wide angular range (that is, with a wide angle of visibility) is obtained.

A liquid crystal apparatus includes: a liquid crystal panel having a pair of substrates; a liquid crystal layer arranged between the pair of substrates and driven by an electric field having a component parallel to the substrates; a first polarizing plate and a second polarizing plate arranged with the liquid crystal panel interposed therebetween; and a retardation film arranged between the first polarizing plate and the liquid crystal panel or between the second polarizing plate and the liquid crystal panel, in which the first polarizing plate and the second polarizing plate each include a polarizer and a translucent protection film which interpose the polarizer, an in-plane phase difference $Re_1$ of the protection film satisfies 0 nm$\leq Re_1 \leq$5 nm, a thickness direction phase difference Rth of the protection film satisfies 40 nm<Rth$\leq$60 nm, an in-plane phase difference $Re_2$ of the retardation film satisfies 100 nm$\leq Re_2 \leq$150 nm, an Nz value of the retardation film satisfies −0.1$\leq$Nz<0.2, and an average refractive ratio Nave of the retardation film satisfies 1.4$\leq$Nave$\leq$2.0.

In this configuration, by selecting the in-plane phase difference $Re_2$, the Nz value, and the average refractive ratio Nave of the retardation film adequately, a liquid crystal apparatus in which the in-plane phase difference $Re_1$ and the thickness direction phase difference Rth of the protection film are compensated to achieve a display having a high-contrast ratio (that is, with a wide angle of visibility) is obtained.

Preferably, the retardation film is arranged between the liquid crystal panel and the first polarizing plate, a slow axis of the retardation film and an axis of absorption of the second polarizing plate are parallel to the direction of alignment of the liquid crystal layer, and an axis of absorption of the first polarizing plate is orthogonal to the direction of alignment of the liquid crystal layer.

In this configuration, a display characteristic of a wide angle of visibility is achieved in the liquid crystal apparatus of an E-mode.

Preferably, the retardation film is arranged between the liquid crystal panel and the second polarizing plate, the slow axis of the retardation film and an axis of absorption of the first polarizing plate are parallel to the direction of alignment of the liquid crystal layer, and an axis of absorption of the second polarizing plate is orthogonal to the direction of alignment of the liquid crystal layer.

In this configuration, a display characteristic of a wide angle of visibility is achieved in the liquid crystal apparatus of an O-mode.

Preferably, the liquid crystal panel is a liquid crystal panel of an IPS mode.

In this configuration, the liquid crystal apparatus of the IPS mode having the display characteristic of a wide angle of visibility is obtained.

Preferably, the liquid crystal panel is a liquid crystal panel of an FFS mode.

In this configuration, the liquid crystal apparatus of the IPS mode having the display characteristic of a wide angle of visibility is obtained.

An electronic apparatus having the liquid crystal apparatus as a display unit.

In this configuration, an electronic apparatus which achieves the display of a wide angle of visibility in the display unit is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
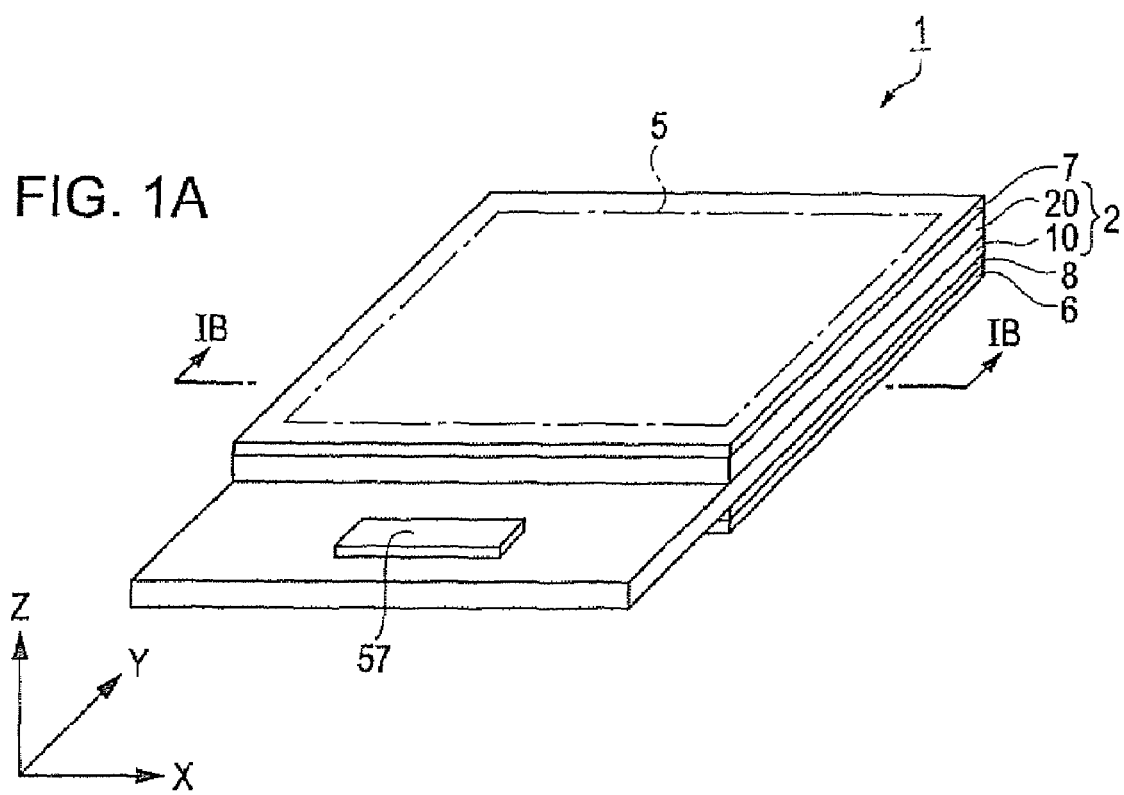
FIG. 1A is a perspective view showing a configuration of a liquid crystal apparatus.

Referring now to the drawings, embodiments of a liquid crystal apparatus and an electric apparatus will be described. In the drawings, the dimensions and the ratio of respective drawings are differentiated among actual members in order to make the respective members recognizable in the drawing.

Figure 1B:
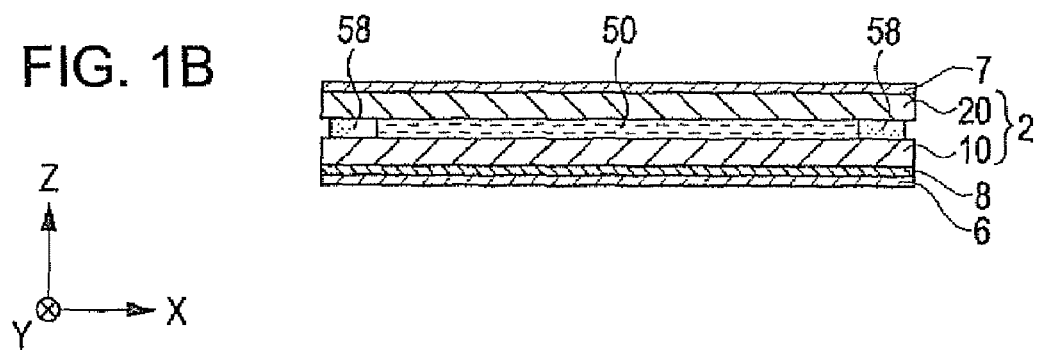
FIG. 1B is a cross-sectional view of the liquid crystal apparatus taken along the line IB-IB in FIG. 1A.
Figure 1C:
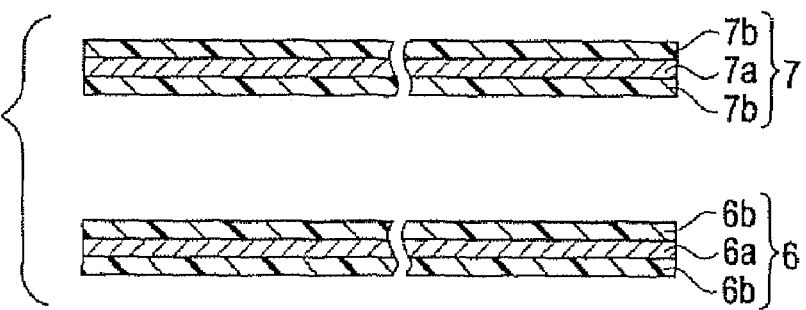
FIG. 1C is a cross-sectional view showing a layer configuration of polarizing plates.

FIG. 1A is a perspective view showing a configuration of a liquid crystal apparatus 1, FIG. 1B is a cross-sectional view of the liquid crystal apparatus taken along the line IB-IB in FIG. 1A, and FIG. 1C is a cross-sectional view showing a layer configuration of polarizing plates 6 and 7. The liquid crystal apparatus 1 includes a liquid crystal panel 2, the polarizing plate 6 as a first polarizing plate and the polarizing plate 7 as a second polarizing plate arranged with the intermediary of the liquid crystal panel 2. A retardation film 8 is arranged between the polarizing plate 6 and the liquid crystal panel 2.

The liquid crystal panel 2 includes an element substrate 10 and an opposed substrate 20 as a pair of substrates adhered so as to oppose to each other by a frame-shaped seal member 58. A liquid crystal layer 50 is encapsulated in a space surrounded by the element substrate 10, the opposed substrate 20, and the seal member 58. The element substrate 10 is larger than the opposed substrate 20, and is adhered to the opposed substrate 20 so as to protrude partly from the opposed substrate 20. A driver IC 57 for driving the liquid crystal layer 50 is mounted to this protruded portion. The polarizing plate 6 is arranged on the element substrate 10 side of the liquid crystal panel 2 and the polarizing plate 7 is arranged on the opposed substrate 20 side of the liquid crystal panel 2. Therefore, the polarizing plate 7, the liquid crystal panel 2, the retardation film 8, and the polarizing plate 6 are laminated in this order, and these elements are adhered to each other via adhesive layers.

As shown in FIG. 1C, the polarizing plate 6 includes a polarizer 6a and a pair of translucent protection films 6b adhered to both surfaces of the polarizer 6a. In the same manner, the polarizing plate 7 includes a polarizer 7a and a pair of translucent protective films 7b adhered to both surfaces of the polarizer 7a.

As the polarizers 6a and 7a, for example, a polyvinyl alcohol-based film adsorbed with a dichromatic substance such as iodine or dichromatic dye and monoaxially stretched is applicable.

As the protection films 6b and 7b, films having an in-plane phase difference $Re_1$ of 10 nm or smaller, more preferably, 5 nm or smaller, a thickness direction phase difference Rth of 0 nm to 100 nm inclusive, more preferably, 0 nm to 60 nm inclusive may be employed without specific limitation. As a material which constitutes the protection films 6b and 7b, for example, cellulose-based polymer such as triacetyl cellulose (TAC) and diacetyl cellulose, polyester-based polymer such as polyethylene terephthalate and polyethylene naphthalate, acrylic-based polymer such as polymethylmethacrylate, styrene-based polymer such as polystyrene and acrylonitrile styrene copolymer (AS resin), polycarbonate-based polymer, and so on may be employed. Polyolefin-based polymer, vinyl-chloride-based polymer, amide-based polymer, imide-based polymer, sulfone-based polymer may also be employed. Alternatively, the protection films 6b and 7b may be formed as an acryl based, urethane-based, epoxy-based, or silicone-based hardening layer of hot cured or UV-cured resin. Among others, triacetyl cellulose is preferable.

The in-plane phase difference $Re_1$ of the protection films 6b and 7b is represented by $Re_1=(nx_1-ny_1)d_1$, where the direction in which the in-plane refractive index of the protection films 6b and 7b becomes maximum is x-axis, the direction parallel to the planes of the protection films 6b and 7b and vertical to the x-axis is y-axis, and the direction of thicknesses of the protection films 6b and 7b is z-axis, the refractive indices in 550 nm in the axial directions are $nx_1$, $ny_1$, and $nz_1$, and the thickness of the protection films 6b and 7b is $d_1$. The thickness direction phase difference Rth of the protection films 6b and 7b is represented by $Tth=\{(nx_1+ny_1)/2-nz_1\}d_1$.

As the retardation film 8, any films having the Nz value from −0.1 to 0.8 inclusive, and an in-plane phase difference $Re_2$ from 50 nm to 400 nm inclusive, more preferably, from 100 nm to 300 nm inclusive, and having the average refractive ratio Nave from 1.4 to 2.0 inclusive may be employed without specific limitation. For example, a birefringence film of a high-molecular polymer film or an alignment film of liquid crystal polymer may be employed. As the high-molecular polymer, for example, triacetyl cellulose (Nave=1.48), ZEONOR (Nave=1.52), polycarbonate (Nave=1.59), PMMA (Nave=1.49), polystyrene (Nave=1.59) may be employed.

In the description shown above, the in-plane phase difference $Re_2$ of the retardation film 8 is represented by $Re_2=(nx_2-ny_2)d_2$, where the direction in which the in-plane refractive index of the retardation film 8 becomes maximum is x-axis, the direction parallel to the plane of the retardation film 8 and vertical to the x-axis is y-axis, and the direction of thicknesses of the retardation film 8 is z-axis, the refractive indices in 550 nm in the respective axial directions are $nx_2$, $ny_2$, and $nz_2$, and the thickness of the retardation film 8 is $d_2$. The Nz value of the retardation film 8 is represented by $Nz=(nx_2-nz_2)/(nx_2-ny_2)$. The average refractive ratio Nave of the retardation film 8 is represented by $Nave=(nx_2+ny_2+nz_2)/3$.

Subsequently, a configuration of the liquid crystal panel 2 will be described in detail. A number of sub pixels 4R, 4G, and 4B (FIG. 2) which contribute the display are arranged in matrix pattern in an area of the liquid crystal panel 2 where the liquid crystal layer 50 is encapsulated. The area including a set of the sub pixels 4R, 4G and 43 is also referred to as a pixel area 5, hereinafter.

Figure 2:
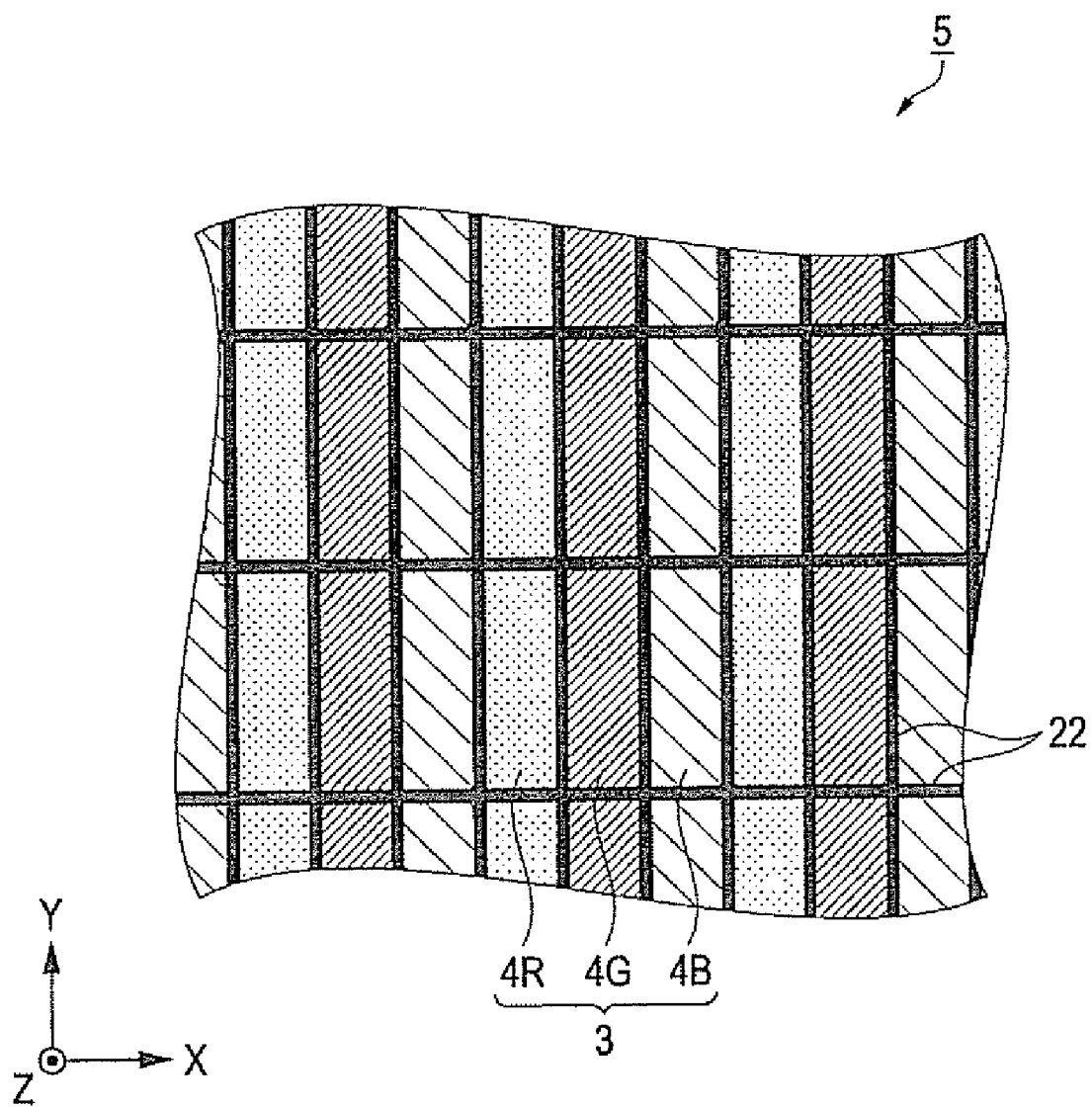
FIG. 2 is an enlarged plan view of a pixel area.

FIG. 2 is an enlarged plan view of the pixel area 5. The pixel area 5 includes a number of the rectangular sub pixels 4R, 4G, and 4B arranged therein. The sub pixels 4R, 4G, and 4B contribute to display one of the colors of red, green, and blue, respectively. When it is not necessary to differentiate the colors of the sub pixels 4R, 4G and 4B, they are simply referred to as a sub pixel 4, hereinafter. The sub pixels 4R, 4G and, 4B each include a color filter 23 (FIG. 5) corresponding to red, green, or blue. The color filter 23 is able to make a transmitted light to a predetermined color by absorbing a specific wavelength component of an incoming light. A light-shielding layer 22 formed on the same layer as the color filter 23 is arranged between the adjacent sub pixels 4.

The sub pixels 4 are arranged in a matrix pattern, and the colors of the sub pixels 4 arranged in the same column are the same. In other words, the sub pixels 4 are arranged in such a manner that the corresponding colors are arranged in a stripe pattern. A pixel 3 includes a set of the three sub pixels 4R, 4G, and 4B aligned adjacently in the row direction. The pixel 3 is the smallest unit (pixel) of display. In the each pixel 3, various types of colors are displayed by adjusting the luminance balance of the sub pixels 4R, 4G, and 4B.

Figure 3:
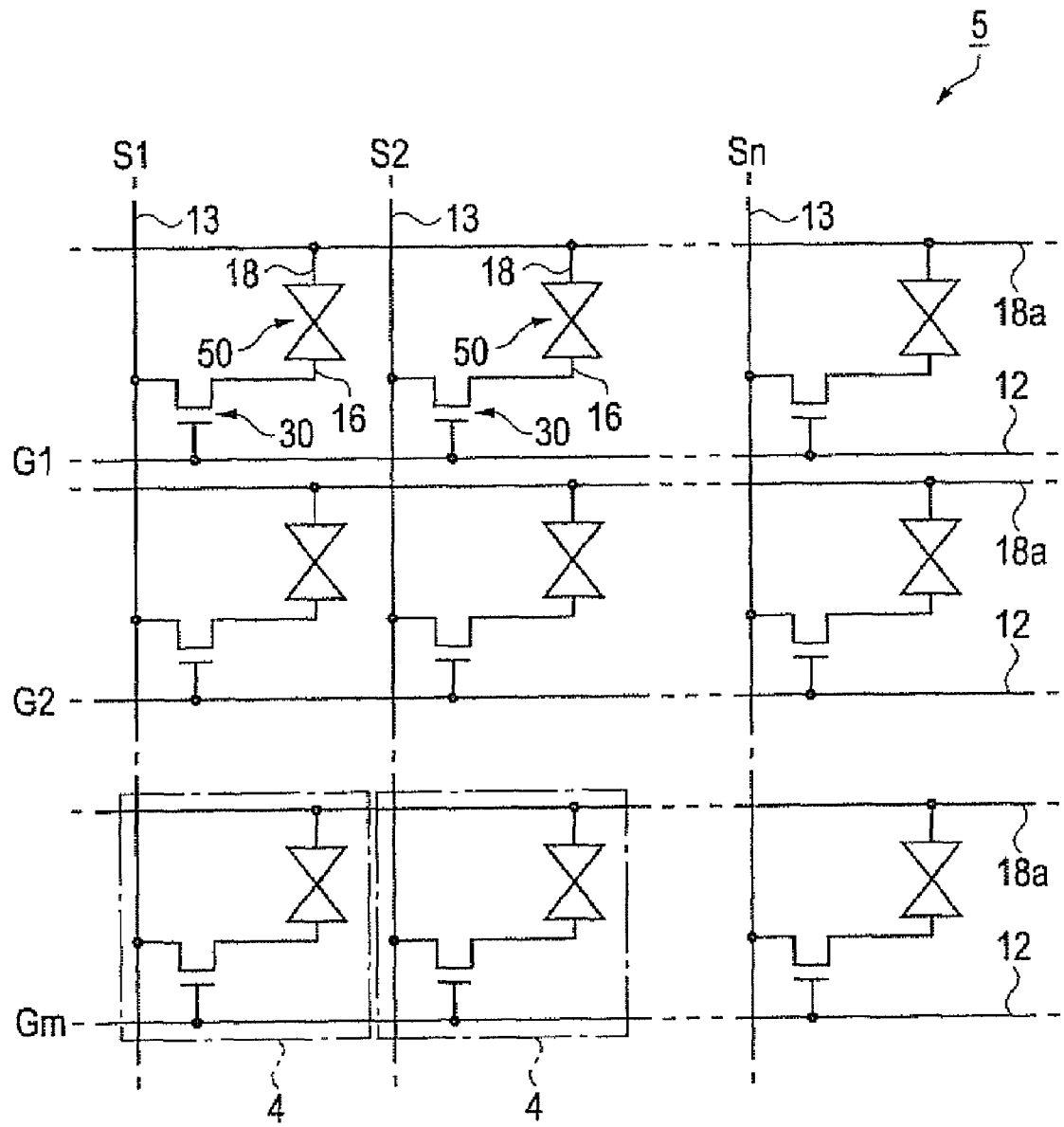
FIG. 3 is an equivalent circuit diagram of respective elements and wirings in a plurality of sub pixels which constitute the pixel area.

FIG. 3 is an equivalent circuit diagram of respective elements and wirings in a plurality of sub pixels 4 which constitute the pixel area 5. In the pixel area 5, a plurality of scanning lines 12 and a plurality of data lines 13 are arranged so as to intersect, and the sub pixels 4 each including a TFT (Thin Film Transistor) element 30 and a pixel electrode 16 are formed corresponding to the intersections between the scanning lines 12 and the data lines 13. The pixel electrode 16 is electrically connected to a drain area of the TFT element 30. The sub pixel 4 includes a common electrode 18 arranged therein. The respective common electrodes 18 are maintained at the same potential via a common line 18a.

The TFT element 30 is turned ON by ON signals included in the scanning signals G1, G2, . . . , Gm supplied from the scanning lines 12 and, at this time, supplies image signals S1, S2, . . . , Sn supplied to the data lines 13 to the pixel electrode 16. Then, when the electric field corresponding to the potential difference between the pixel electrode 16 and the common electrode 18 is applied to the liquid crystal layer 50, the state of alignment of the liquid crystal layer 50 is changed. Accordingly, the polarization converting function of the liquid crystal panel 2 can be brought into a desired state.

Figure 4:
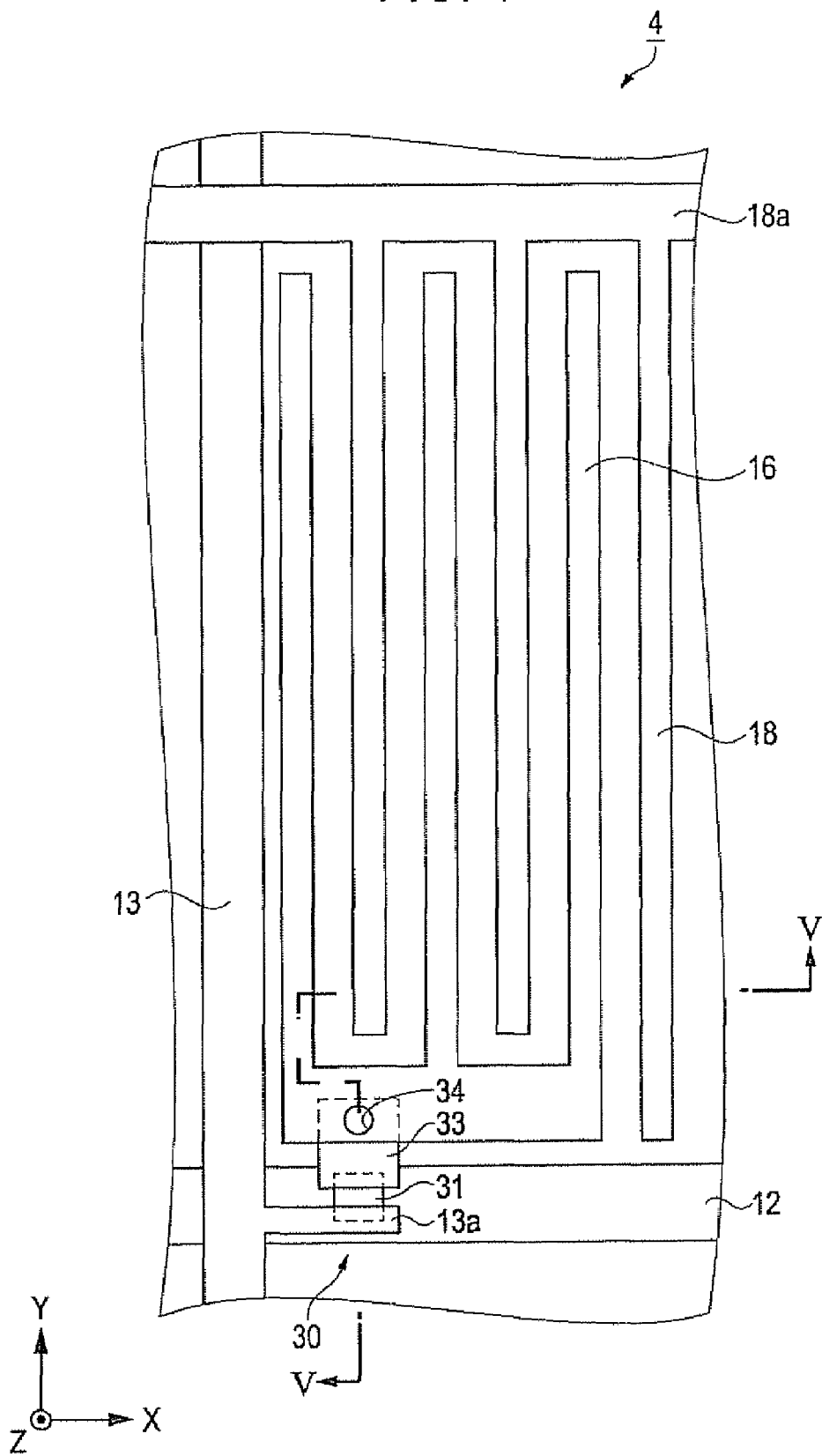
FIG. 4 is a plan view showing an extracted part of an element substrate which corresponds to one sub pixel.
Figure 5:
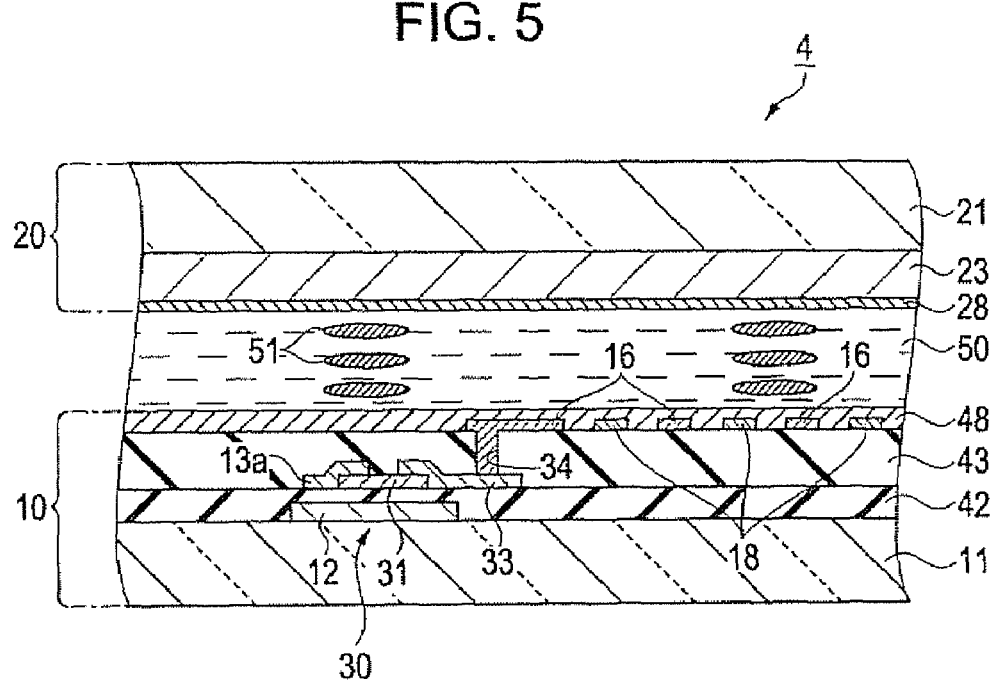
FIG. 5 is a cross-sectional view taken along the line V-V in FIG. 4.

Referring now to FIG. 4 and FIG. 5, components of the sub pixel 4 will be described in detail. FIG. 4 is a plan view showing an extracted part of the element substrate 10 which corresponds to one sub pixel 4. FIG. 5 is a cross-sectional view taken along the line V-V in FIG. 4. In the description given below, terms "upper layer" and "lower layer" represent layers formed on the upper side and the lower side with respect to each other in FIG. 5.

As shown in FIG. 4, the each sub pixel 4 includes the scanning line 12 and the data line 13 so as to intersect, and the TFT element 30 is formed corresponding to the intersection. In this specification, the direction of extension of the scanning lines 12 is referred to as X-direction, and the direction of extension of the data lines 13 is referred to as Y-direction. The each sub pixel 4 includes the pixel electrode 16 and the common electrode 18 each having a portion formed into the shape of comb teeth. The pixel electrode 16 is electrically connected to a drain electrode 33 of the TFT element 30. The common electrode 18 is formed integrally with the common line 18a and is electrically connected to the common electrodes 18 of the adjacent sub pixels 4 via the common line 18a. The pixel electrode 16 and the common electrode 18 are arranged so as to oppose to each other in a state in which the portion formed into the shape of comb teeth are loosely and alternately fitted to each other.

Referring now to FIG. 5, the cross-sectional structure of the sub pixel 4 will be described. The scanning line 12 is formed on the surface of the glass substrate 11 opposing the glass substrate 21. A capacity line which forms a capacity with respect to the drain electrode 33 may be formed on the same layer as the scanning lines 12. An insulating film formed of silicon oxide ($SiO_2$) or the like may be provided between the glass substrate 11 and the scanning line 12. A semiconductor layer 31 is formed in the upper layer of the scanning line 12 with the intermediary of a gate insulating layer 42 formed of the silicon oxide ($SiO_2$) or the like. The semiconductor layer 31 may be formed of, for example, amorphous silicon. A source electrode 13a and the drain electrode 33 are formed in a state of partly overlapping with the semiconductor layer 31. The source electrode 13a is formed integrally with the data line 13 (FIG. 4). The TFT element 30 is composed of the semiconductor layer 31, the source electrode 13a, the drain electrode 33, the scanning line 12, and so on. The scanning line 12 serves as a gate electrode of the TFT element 30. The scanning line 12 (gate electrode), the source electrode 13a (data line 13), and the drain electrode 33 may be formed of simple metal, alloy, metal silicide, polysilicide, a lamination thereof, a conductive polysilicone, or other materials including at least one of metals such as titanium (Ti), chrome (Cr), tungsten (W), tantalum (Ta), molybdenum (Mo), aluminum (Al).

In the upper layer of the TFT element 30, the pixel electrode 16 and the common electrode 18 formed of ITO (indium Tin Oxide) having translucency are formed with the intermediary of an inter-layer insulating layer 43 formed of silicon oxide ($SiO_2$). In the cross section in FIG. 5, the comb-teeth-shaped portions of the common electrode 18 and the pixel electrode 16 are arranged alternately. The pixel electrode 16 is electrically connected to the drain electrode 33 of the TFT element 30 via a contact hole 34 provided in the inter-layer insulating layer 43. In this manner, the pixel electrode 16 and the common electrode 18 are formed on the surface of the glass substrate 11 opposing the glass substrate 21.

A alignment film 48 formed of polyimide is formed on the pixel electrode 16 and the common electrode 18. The alignment film 48 is a member which is in contact with the liquid crystal layer 50 and, by rubbing the alignment film 48, liquid crystal molecules 51 of the liquid crystal layer 50 are aligned in the rubbing direction. In this embodiment, the alignment film 48 is rubbed along a direction of +95°. The rubbing direction or the direction of alignment of the liquid crystal molecules 51 in this specification is represented by an azimuth angle increasing leftward (counterclockwise) from the normal direction of the X-axis which corresponds to 0° about the Z-axis when viewing the x-Y plane from the normal direction of the Z-axis. The element substrate 10 includes components from the glass substrate 11 to the alignment film 48.

On the other hand, the color filter 23 and an alignment film 28 are laminated in this order on the surface of the glass substrate 21 opposing the glass substrate 11. The layer formed with the color filter 23 is, more specifically, formed with three types of color filters 23 corresponding to red, green, and blue, and the light-shielding layer 22 (FIG. 2) arranged between the color filters 23 of respective colors. The alignment film 28 is formed of polyimide, and has the same property as the alignment film 48 on the element substrate 10 side. In this embodiment, the alignment film 48 is rubbed in a direction of −95. Therefore, the rubbing directions of the alignment films 28 and 48 are parallel to each other and reverse from each other. The opposed substrate 20 includes the components from the glass substrate 21 to the alignment film 28.

The liquid crystal layer 50 having the liquid crystal molecules 51 is arranged in an area between the element substrate 10 and the opposed substrate 20, that is, in an area interposed between the alignment film 28 and the alignment film 48. And of the liquid crystal layer 50 (the product of a birefringence ratio Δn of the liquid crystal molecules 51 and a thickness d of the liquid crystal layer 50) may be set to a value, for example, between 300 nm to 400 nm. In this embodiment, it is set to 360 nm.

The liquid crystal molecules 51 of the liquid crystal layer 50 is aligned in the rubbing direction of the alignment films 28 and 48, that is, in the direction of an angle of 95° when no voltage is applied (including a case in which a weak voltage which corresponds to the OFF state is applied, hereinafter). Since the rubbing directions of the alignment films 28 and 48 are parallel to each other and reverse from each other as described above, the liquid crystal layer 50 assumes so-called an anti-parallel alignment. Therefore, at least part of the liquid crystal molecules 51 of the liquid crystal layer 50 is aligned in parallel to the glass substrate 11 irrespective of the magnitude of the drive voltage (magnitude of the electric field).

Figure 6:
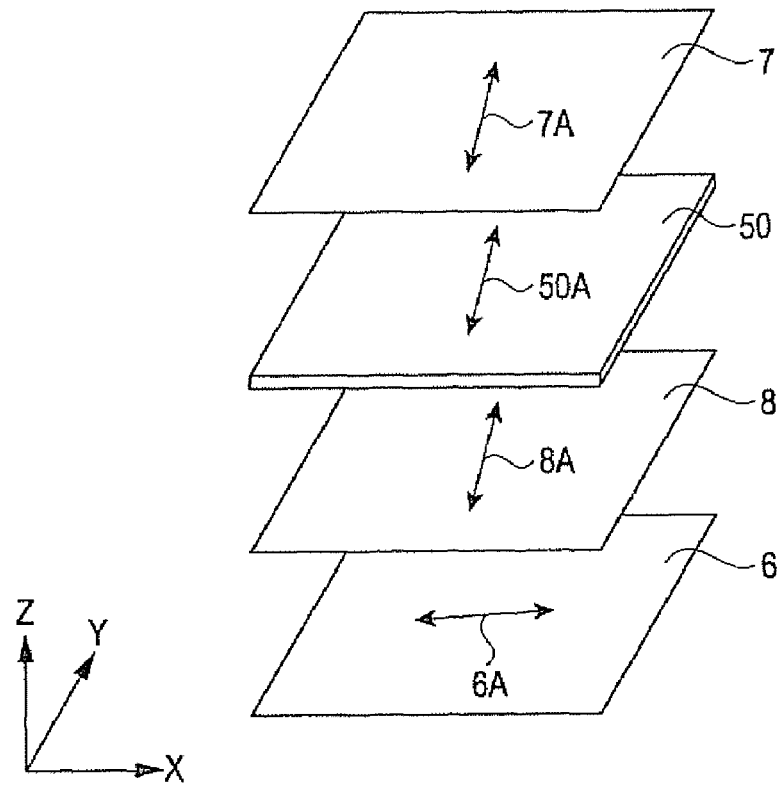
FIG. 6 is a schematic drawing showing an orientation of the polarizing plates and a retardation film.

FIG. 6 is a schematic drawing showing an orientation of polarizing plates 6 and 7 and the retardation film 8. In FIG. 6, an alignment direction 50A of the liquid crystal layer 50, axes of absorption 6A and 7A of the polarizing plates 6 and 7, and the direction of a slow axis 8A of the retardation film 8 are indicated by arrows. Here, the lag axis 8A of the retardation film 8 and the axis of absorption 7A of the polarizing plate 7 are in parallel with the alignment direction 50A of the liquid crystal layer 50, and the axis of absorption 6A of the polarizing plate 6 is orthogonal to the alignment direction 50A of the liquid crystal layer 50. Therefore, the directions of the slow axis 8A and the axis of absorption 7A are 95° as that of the alignment direction 50A and the direction of the axis of absorption 6A is 5°. The liquid crystal apparatus 1 in this configuration is referred to as an E-mode.

The liquid crystal apparatus 1 achieves display by taking a light from a backlight (not shown) entering from the polarizing plate 6 side out from the polarizing plate 7 side. Therefore, an observer views the display from the polarizing plate 7 side (from the normal direction of the Z-axis). The liquid crystal apparatus 1 is able to achieve various types of display by modulating the incident light by the polarization converting function of the liquid crystal panel 2 and the polarization selecting function of the polarizing plates 6 and 7.

Subsequently, an operation of the liquid crystal apparatus 1 having the configuration as shown above will be described. In the case of operating the liquid crystal apparatus 1, while the common electrode 18 is maintained at a predetermined common potential, an image signal is written in the pixel electrode 16 via the data lines 13 and the TFT element 30. Accordingly, the drive voltage corresponding to the magnitude of the image signal is applied between the common electrode 18 and the pixel electrode 16. When the drive voltage is applied and the potential difference is generated, an electric field which has an electric line of force coming out from the surface of the pixel electrode 16 and reaches the surface of the common electrode 18 is generated. At this time, above the common electrode 18 and the pixel electrode 16, that is, in the layer in which the liquid crystal layer 50 is arranged, an electric field which is parallel to the glass substrate 11 (lateral electric field) is generated. In other words, the electric field has a component which is parallel to the glass substrate 11. The direction of the lateral electric field in plan view is a direction orthogonal to the direction of extension of the comb-teeth-shaped electrodes such as the common electrode 18 and the pixel electrode 16. The liquid crystal molecules 51 included in the liquid crystal layer 50 change in the direction of alignment in the plane parallel to the glass substrate 11 according to the magnitude of the lateral electric field. Here, an angle formed between the direction of alignment of the liquid crystal molecules 51 when no voltage is applied and the direction of the lateral electric field generated when the voltage is applied (the direction orthogonal to the direction of extension of the comb-teeth-shaped electrodes of the common electrode 18 and the pixel electrode 16) is about 85°. In this configuration, the direction of rotation of the liquid crystal molecules 51 when the lateral electric field is applied is uniformized. Accordingly, generation of domain which is caused by non-uniformity of the direction of rotation is restrained.

When no voltage is applied, the liquid crystal molecules 51 of the liquid crystal layer 50 are aligned along the rubbing direction (95°) of the alignment films 28 and 48. At this time, since the polarization axis of a linear polarized light transmitted through the polarizing plate 6 is orthogonal to the direction of alignment of the liquid crystal molecules 51, the linear polarized light is not be provided with the phase difference by the liquid crystal layer 50 and is transmitted through the liquid crystal layer 50 as is, thereby being absorbed by the polarizing plate 7. Therefore, when no voltage is applied, a display light is not taken out from the polarizing plate 7, so that the black display is resulted.

In contrast, when the voltage is applied, the liquid crystal molecules 51 of the liquid crystal layer 50 is driven by the lateral electric field, and the direction of alignment is changed from an angle of 95°. At this time, since the polarization axis of a linear polarized light transmitted through the polarizing plate 6 is not orthogonal to the direction of alignment of the liquid crystal molecules 51, the linear polarized light is provided with the phase difference by the liquid crystal layer 50, whereby the polarized state is changed. The amount of change in the polarized state depends on the retardation ($\Delta$nd) of the liquid crystal layer 50 and the angle of rotation of the liquid crystal molecules 51. The light changed in the polarized state by being transmitted through the liquid crystal layer 50 has a component which is orthogonal to the axis of absorption of the polarizing plate 7 and hence enters the polarizing plate p7, so that part or entire part of the light is transmitted through the polarizing plate 7, thereby being viewed by the observer. In this manner, when the voltage is applied, for example, the white display is resulted.

When a voltage of a middle magnitude between that at the time of the black display and that at the time of the white display is applied, the direction of alignment of the liquid crystal molecules 51 is changed by an angle according to the magnitude of the voltage. Therefore, the amount of the change in the polarized state which the transmitted light caused by the liquid crystal layer 50 is subjected is changed. Therefore, the light amount transmitted through the polarizing plate 7 is changed depending on the magnitude of the applied voltage, and a half-tone display is achieved.

The liquid crystal mode as described above is referred to as an IPS mode. Since the liquid crystal molecules 51 are always maintained in substantially parallel to the glass substrate 11 in the IPS mode, the change in retardation depending on the angle of visibility is small, and hence the display of a wide angle of visibility is achieved.

In this embodiment, the display characteristic of a wider angle of visibility is achieved by the arrangement of the retardation film 8 between the liquid crystal panel 2 and the polarizing plate 6. The retardation film 8 provides a phase difference to the light entered into the polarizing plate 6 in the direction shifted from a predetermined optical axis (Z-axis), so that a light leak when the light is emitted from the polarizing plate 7 is reduced. Therefore, the retardation film 8 has a function to compensate the lowering of the contrast when the liquid crystal apparatus 1 is viewed obliquely (from the direction angled from the Z-axis).

In particular, by setting a characteristic value of the retardation film 8 adequately according to characteristic values of the protection films 6b and 7b included in the polarizing plates 6 and 7, a high-contrast display is obtained in a wider range of angle.

More specifically, when the in-plane phase difference $Re_1$ and the thickness direction phase difference Rth of the protection films 6b and 7b satisfy;

0 nm$\leq Re_1 \leq$5 nm
0 nm$\leq$Rth$\leq$20 nm as a first condition, the display characteristic with a wide angle of visibility is obtained by setting the in-plane phase difference $Re_2$, the Nz value, and the average refractive ratio Nave of the retardation film 8 to values within the range of;

200 nm$\leq Re_2 \leq$300 nm
0.4<Nz$\leq$0.8
1.4$\leq$Nave$\leq$2.0.

In contrast, when the in-plane phase difference $Re_1$ and the thickness direction phase difference Rth of the protection films 6b and 7b satisfy;

0 nm$\leq Re_1 \leq$5 nm
20 nm$\leq$Rth$\leq$40 nm as a second condition, the display characteristic with a wide angle of visibility is obtained by setting the in-plane phase difference $Re_2$, the Nz value, and the average refractive ratio Nave of the retardation film 8 to values within the range of;

100 nm$\leq Re_2 \leq$150 nm
0.2<Nz$\leq$0.4
1.4$\leq$Nave$\leq$2.0.

Also, when the in-plane phase difference $Re_1$ and the thickness direction phase difference Rth of the protection films 6b and 7b satisfy;

0 nm$\leq Re_1 \leq$5 nm
40 nm$\leq$Rth$\leq$60 nm as a third condition, the display characteristic with a wide angle of visibility is obtained by setting the in-plane phase difference $Re_2$, the Nz value, and the average refractive ratio Nave of the retardation film 8 to values within the range of;

100 nm$\leq Re_2 \leq$150 nm
−0.1<Nz$\leq$0.2
1.4$\leq$Nave$\leq$2.0.

As is understood from the examples shown above, it is preferable to set the average refractive ratio Nave of the retardation film 8 to 1.4$\leq$Nave$\leq$2.0 in any conditions. The range of angle which provides a high contrast is widened by setting the average refractive ratio Nave to 1.4 or higher. Also, the retardation film 8 having a high reliability in heat resistance or the like is obtained by setting the average refractive ratio Nave to 2.0 or lower.

Figure 7:
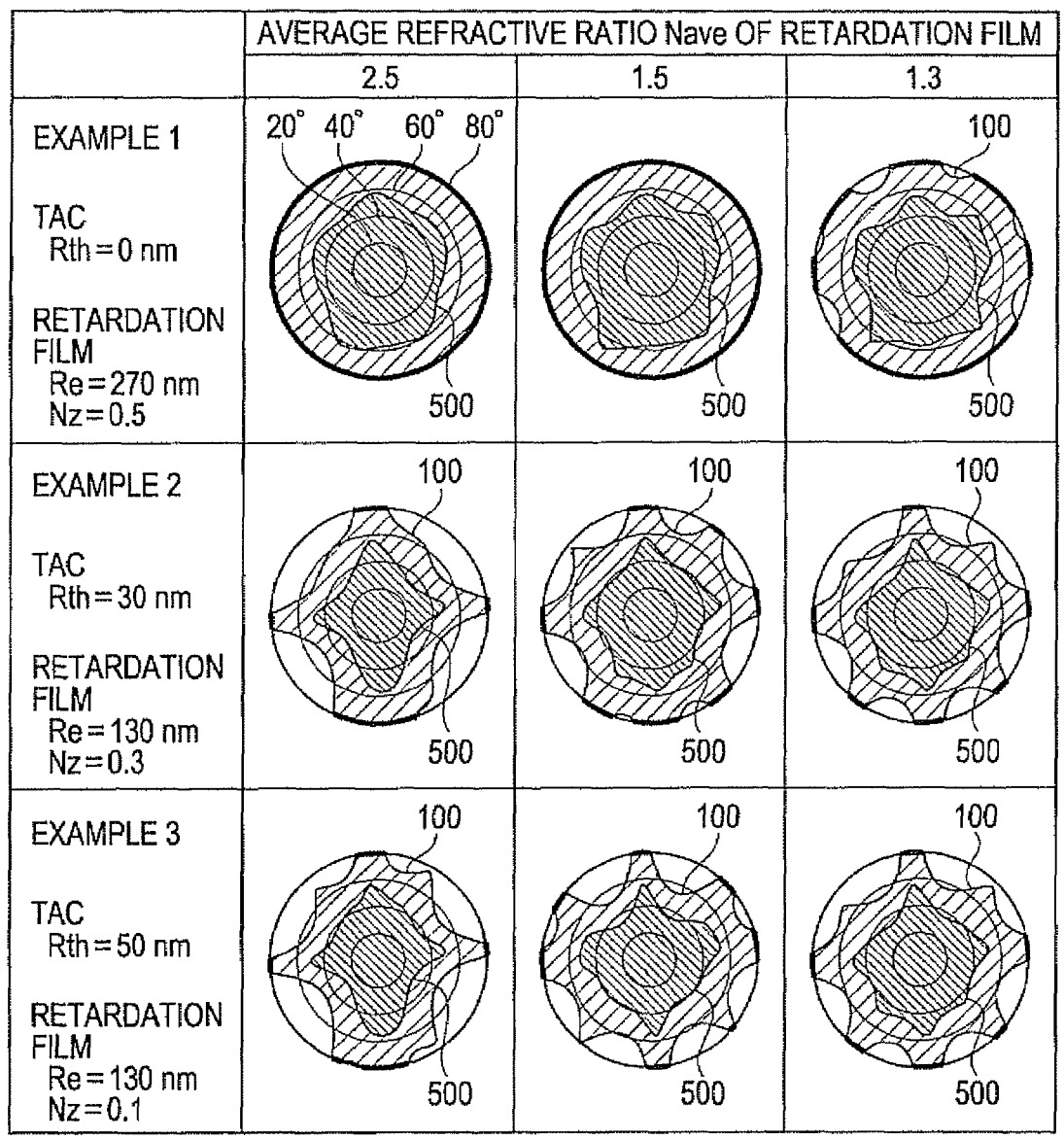
FIG. 7 is a drawing showing an angle-of-visibility characteristics of the liquid crystal apparatus in a case where an average refractive ratio Nave of the retardation film is changed in respective embodiments.

Examples from 1 to 3 shown below are detailed examples which show that the range of the average refractive ratio Nave from 1.4 to 2.0 inclusive is preferable for the first to the third conditions described above. FIG. 7 is a drawing showing an angle-of-visibility characteristics of the liquid crystal apparatus 1 in a case where the average refractive ratio Nave of the retardation film is changed in respective embodiments. More specifically, it is a drawing showing contrasts distribution of the display when the direction of observation is changed. The center points of the respective graphs correspond to the direction of the normal line of the liquid crystal panel 2 (Z-axis direction), and concentric circles correspond to the angles from the direction of the normal line (polar angle) is 20°, 40°, 60°, and 80° in ascending order in diameter. Contours in the graphs show distribution in the direction in which the contrast is 100 or 500. In the each graph, a portion in which the contrast is 100 or higher at a position of the outer periphery (the line corresponding to a polar angle of 80°) is illustrated by a thick line. Therefore, the condition in which the percentage of the thick line in the outer periphery is higher can be understood to be a condition which achieves a wider angle of visibility.

Example 1

In this embodiment, a TAC having an in-plane phase difference $Re_1$ of 0 nm, and a thickness direction phase difference Rth of 0 nm is used as the protection films 6b and 7b. A film having an in-plane phase difference $Re_2$ of 270 nm and a Nz value of 0.5 is used as the retardation film 8. The average refractive ratio Nave of the retardation film 8 is changed to three values of 2.5/1.5/1.3, and the angle-of-visibility characteristics of the liquid crystal apparatus 1 for the respective conditions are obtained (upper row in FIG. 7).

As is understood from FIG. 7, when the average refractive ratio Nave is 2.5 or 1.5, the contrast at a polar angle of 80° is 100 or higher for all the directions, and the high-angle-of-visibility characteristics are obtained. In contrast, it is confirmed that when the average refractive ratio Nave is set to 1.3, the contrast at a polar angle of 80° underruns the value of 100 in a certain part of direction, so that the angle of visibility is narrowed. In terms of the wideness of the angle of visibility, it is preferable to set the average refractive ratio Nave of the retardation film 8 to be 1.4 or higher.

When the average refractive ratio Nave is larger than 2.0, the reliability is lowered because of narrowing of options of the preferred materials.

Table 1 shown below shows the chromaticity of the black display when viewed from an azimuth angle of 60° and a polar angle of 45° when the average refractive ratio Nave of the retardation film 8 is changed (according to CIE chromaticity coordinate). In this embodiment, as understood from the upper row in Table 1, the chromaticity of black is tinged with blue in the case where the average refractive ratio Nave is set to 2.5 (x=0.215, y=0.142) in comparison with the case where the average refractive ratio Nave is 1.5 (x=0.221, 0.160). In this manner, in terms of reliability and the chromaticity of the black display, it is preferable to set the average refractive ratio Nave of the retardation film 8 to 2.0 or lower.

TABLE 1

| | AVERAGE REFRACTIVE RATIO Nave OF RETARDATION FILM | | |
|---|---|---|---|
| | 2.5 | 1.5 | 1.3 |
| EXAMPLE 1 | (0.215, 0.142) | (0.221, 0.160) | (0.221, 0.160) |
| EXAMPLE 2 | (0.309, 0.208) | (0.348, 0.229) | (0.402, 0.299) |
| EXAMPLE 3 | (0.205, 0.119) | (0.329, 0.273) | (0.397, 0.369) |

Example 2

In this embodiment, the TAC having an in-plane phase difference $Re_1$ of 0 nm and a thickness direction phase difference Rth of 30 nm is used as the protection films 6b and 7b. A film having an in-plane phase difference $Re_2$ of 130 nm, and an Nz value of 0.3 is used as the retardation film 8. The average refractive ratio Nave of the retardation film 8 is changed to three values of 2.5/1.5/1.3, and the angle-of-visibility characteristics of the liquid crystal apparatus 1 for the respective conditions are obtained (middle row in FIG. 7).

As is understood from FIG. 7, when the average refractive ratio Nave is 1.5, the range of direction in which the contrast is 100 or higher at a polar angle of 80° is significantly increased in comparison with the case in which the average refractive ratio Nave is 1.3. In contrast, when the average refractive ratio Nave is set to 2.5, although the contrast at a polar angle of 80° reaches the value of 100 in a certain part of direction, the area in which the contrast is 100 or higher is significantly decreased. In terms of the wideness of the angle of visibility, it is preferable to set the average refractive ratio Nave of the retardation film 8 to be from 1.4 to 2.0 inclusive.

When the average refractive ratio Nave is larger than 2.0, the reliability is lowered because of narrowing of options of the preferred materials.

In this embodiment, as shown in the middle row in Table 1, the chromaticity of black is tinged with blue in the case where the average refractive ratio Nave is set to 2.5 (x=0.309, y=0.208) in comparison with the case where the average refractive ratio Nave is 1.5 (x=0.348, 0.229). In this manner, in terms of reliability and the chromaticity of the black display, it is preferable to set the average refractive ratio Nave of the retardation film 8 to 2.0 or lower.

Example 3

In this embodiment, the TAC having an in-plane phase difference $Re_1$ of 0 nm and a thickness direction phase difference Rth of 50 nm is used as the protection films 6b and 7b. A film having an in-plane phase difference $Re_2$ of 130 nm, and an Nz value of 0.1 is used as the retardation film 8. The average refractive ratio Nave of the retardation film 8 is changed to three values of 2.5/1.5/1.3, and the angle-of-visibility characteristics of the liquid crystal apparatus 1 for the respective conditions are obtained (lower column in FIG. 7).

As is understood from FIG. 7, when the average refractive ratio Nave is 1.5, the range of direction in which the contrast is 100 or higher at a polar angle of 80° is increased in comparison with the case in which the average refractive ratio Nave is 1.3. In particular, when the average refractive ratio Nave is set to 1.3, there are six azimuth areas in which the contrast reaches 100 at a polar angle of 80°, while when the average refractive ratio Nave is set to 1.5, the number of the same areas is increased to eight. In contrast, when the average refractive ratio Nave is set to 2.5, although the contrast at a polar angle of 80° reaches the value of 100 in a certain part of direction, the area in which the contrast is 100 or higher is significantly decreased. In terms of the wideness of the angle of visibility, it is preferable to set the average refractive ratio Nave of the retardation film 8 to be from 1.4 to 2.0 inclusive.

When the average refractive ratio Nave is larger than 2.0, the reliability is lowered because of narrowing of options of the preferred materials.

In this embodiment, as shown in the lower row in Table 1, the chromaticity of black is significantly tinged with blue in the case where the average refractive ratio Nave is set to 2.5 (x=0.205, y=0.119) in comparison with the case where the average refractive ratio Nave is 1.5 (x=0.329, 0.273). In this manner, in terms of reliability and the chromaticity of the black display, it is preferable to set the average refractive ratio Nave of the retardation film 8 to 2.0 or lower.

Electronic Apparatus

Figure 12:
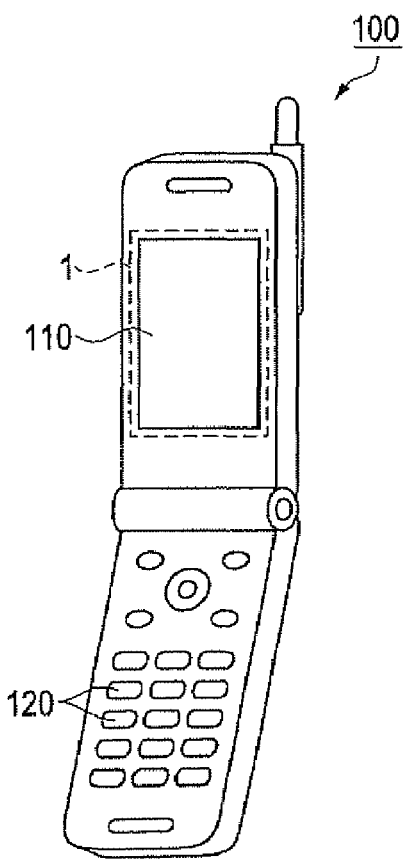
FIG. 12 is a perspective view of a mobile phone as an electronic apparatus.

The liquid crystal apparatus 1 described thus far may be used by mounting on electronic apparatuses, such as mobile phone. FIG. 12 is a perspective view of a mobile phone 100 as an electronic apparatus. The mobile phone 100 includes a display unit 110 and operating buttons 120. The display unit 110 is able to display various data including contents entered with the operating buttons 120 or incoming-call data by the liquid crystal apparatus 1 integrated therein. At this time, by the operation of the retardation film 8 included in the liquid crystal apparatus 1, the display with wide angle of visibility is achieved in the display unit 110.

The liquid crystal apparatus 1 may be used in various electronic apparatus such as mobile computers, digital cameras, digital video cameras, vehicle-mounted apparatus, and audio apparatuses in addition to the above-described mobile phone 100.

In the embodiments shown above, various modifications may be made. As modifications, for example, the following modes are contemplated.

Modification 1

Figure 8A:
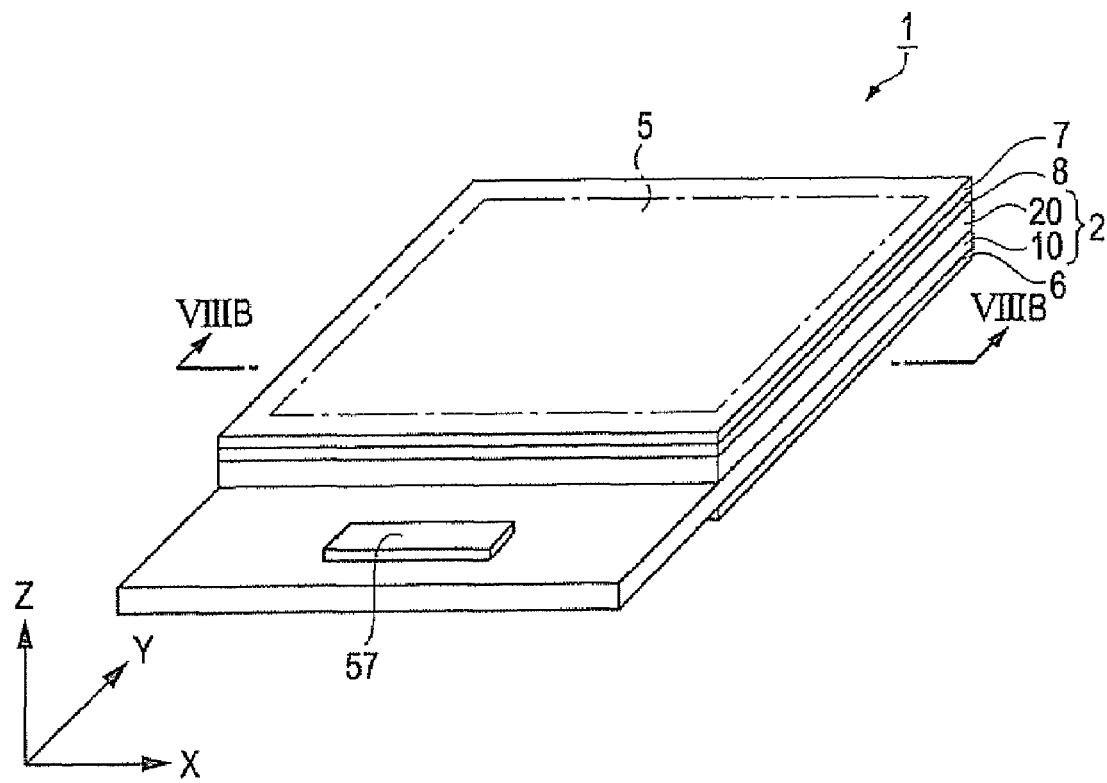
FIG. 8A is a perspective view of a liquid crystal apparatus of an O-mode according to a first modification.
Figure 8B:
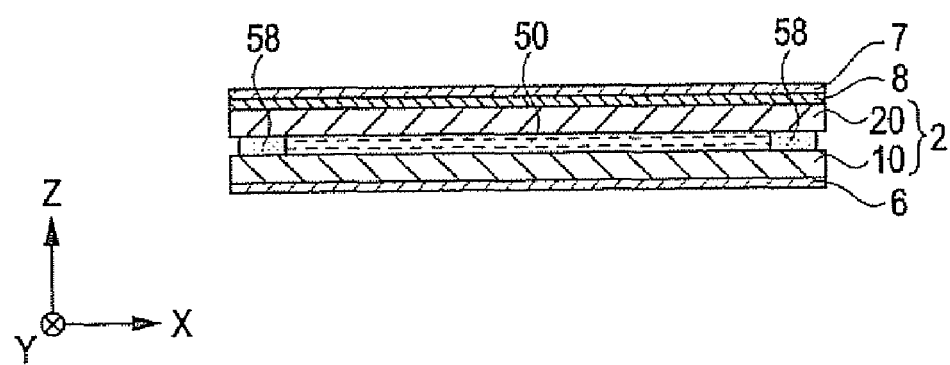
FIG. 8B is a cross-sectional view taken along the line VIIIB-VIIIB in FIG. 8A.
Figure 9:
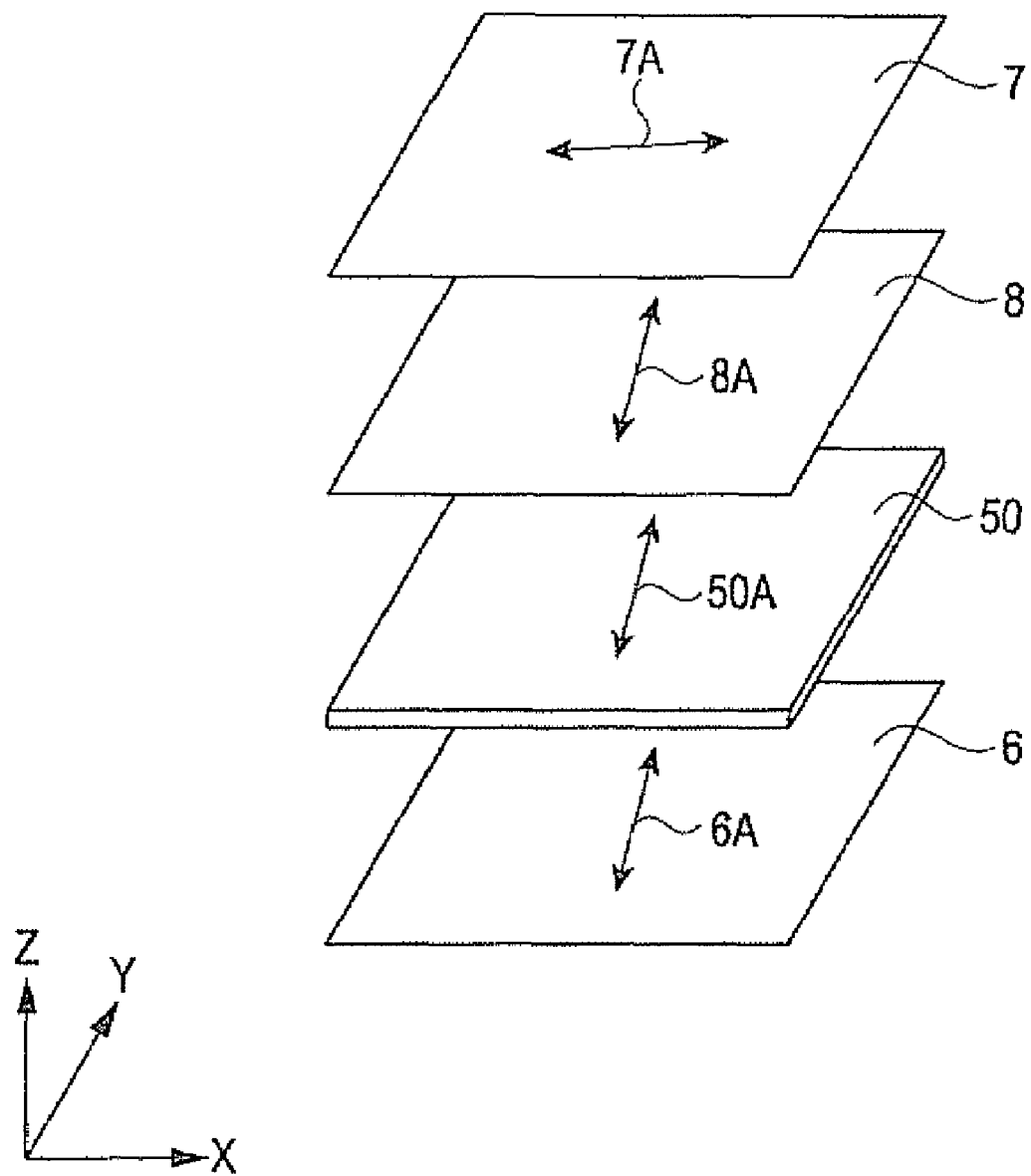
FIG. 9 is a schematic drawing showing an orientation of the direction of alignment of the liquid crystal layer and the orientations of the polarizing plates and the retardation film in the liquid crystal apparatus of the O-mode.

Although the liquid crystal apparatus 1 of the E-mode has been described in the embodiments described above, the liquid crystal apparatus 1 may be of the O-mode. FIG. 8A is a perspective view of the liquid crystal apparatus 1 of the O-mode according to a first modification, and FIG. 8B is a cross-sectional view taken along the line VIIIB-VIIIB in FIG. 8A. As shown in these drawings, the retardation film 8 is arranged between the liquid crystal panel 2 and the polarizing plate 7 as the second polarizing plate in this modification. FIG. 9 is a schematic drawing showing an orientation of the alignment direction 50A of the liquid crystal layer 50 and the orientations of the polarizing plates 6 and 7 and the retardation film 8 in the liquid crystal apparatus 1 of the O-mode. As shown in FIG. 9, the lag axis 8A of the retardation film 8 and the axis of absorption 6A of the polarizing plate 6 are in parallel with the alignment direction 50A of the liquid crystal layer 50, and the direction is 95°. The axis of absorption 7A of the polarizing plate 7 is orthogonal to the alignment direction 50A of the liquid crystal layer 50, and the direction is 5. The E-mode of the liquid crystal device 1 in this configuration is referred to as the O-mode. In this configuration as well, the angle of visibility of the liquid crystal apparatus 1 can be widened by setting the in-plane phase difference Re2, the Nz value, and the average refractive ratio Nave of the retardation film 8 to adequate values (the similar values as those in the embodiments shown above) according to the in-plane phase difference Re1 and the thickness direction phase difference Rth of the protecting films 6b and 7b.

Modification 2 liquid crystal apparatus 1 in the respective embodiments employs the liquid crystal panel 2 of the IPS mode. However, the FFS mode may be employed instead. This modification relates to the liquid crystal apparatus 1 having the liquid crystal panel 2 to which the FFS mode is applied.

Figure 10:
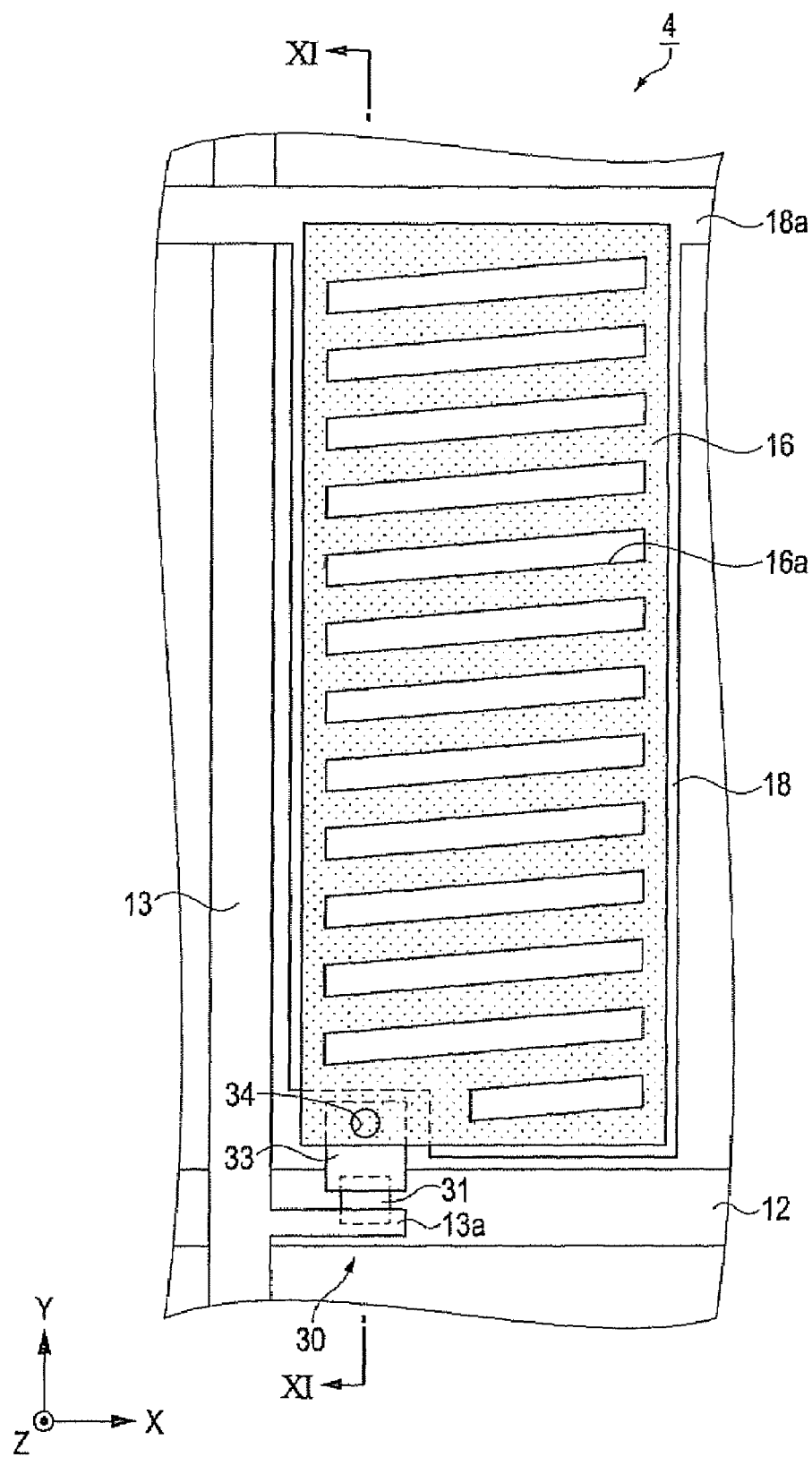
FIG. 10 is a plan view showing an extracted part of an element substrate of the liquid crystal apparatus in which the FFS mode is applied which corresponds to one sub pixel.
Figure 11:
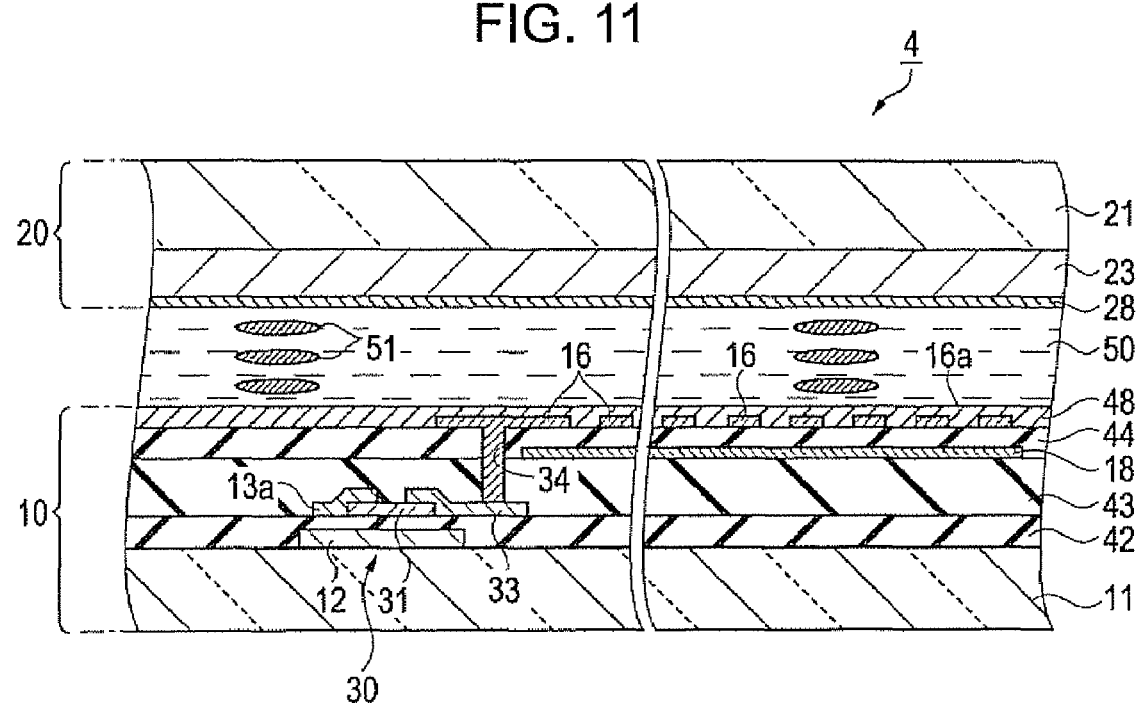
FIG. 11 is a cross-sectional view taken along the line XI-XI in FIG. 10.

FIG. 10 is a plan view showing an extracted part of the element substrate 10 of the liquid crystal panel 2 in which the FFS mode is applied, which corresponds to one sub pixel 4. FIG. 11 is a cross-sectional view taken along the line XI-XI in FIG. 10. In the following description, the components which are common to FIG. 4 and FIG. 5 are not explained.

As shown in FIG. 10, a substantially rectangular pixel electrode 16 are electrically connected to the TFT element 30. The pixel electrode 16 is formed with a number of parallel slits (openings) 16a at a regular distance. The slit 16a is formed into an elongated rectangle or parallelogram and longer sides thereof are inclined at a predetermined angle with respect to the direction of the X-axis. In this embodiment, the angle is 5°. The common electrode 18 is formed in the layer on the lower side of the pixel electrode 16. The common electrode 18 is formed at positions overlapped with the substantially entire surface of the pixel electrode 16 when viewed from the positive side of the Z-axis.

As shown in FIG. 11, the common electrode 18 formed of ITO is laminated in the upper layer of the TFT element 30 with the intermediary of the inter-layer insulating layer 43 formed of silicon oxide ($SiO_2$) or the like.

The pixel electrode 16 formed of ITO is formed in the upper layer of the common electrode 18 with the intermediary of an inter-layer insulating layer 44 formed of silicon oxide ($SiO_2$). The pixel electrode 16 is provided independently for each sub pixel 4. The pixel electrode 16 is electrically connected to the drain electrode 33 via the contact hole 34 provided so as to penetrate through the inter-layer insulating layers 43 and 44. The pixel electrode 16 is provided with a number of the slits 16a as described above. Here, the pixel electrode 16, the common electrode 18, and the inter-layer insulating layer 44 interposed therebetween also function as an accumulated capacity. The alignment film 48 formed of polyimide is formed on the pixel electrode 16.

In this modification, the alignment films 28 and 48 are rubbed in the direction of 0°. Therefore, the liquid crystal layer 50 is in an anti-parallel alignment in the direction of 0°. In association with this, in this modification, the axes of absorption of the polarizing plates 6 and 7 and a slow axis of the retardation film 8 are changed into 0° for those which are 95° in the embodiments or the modifications and to 90° for those which are 50°.

While the common electrode 18 is maintained at a predetermined common potential, image signals are written into the pixel electrode 16 via the data lines 13 and the TFT element 30. Therefore, the drive voltage according to the magnitude of the image signal is applied between the common electrode 18 and the pixel electrode 16. When the drive voltage is applied and the potential difference is generated, an electric field which has an electric line of force coming out from the surface of the pixel electrode 16 and reaches the surface of the common electrode 18 is generated. At this time, above the pixel electrode 16, that is, in the layer in which the liquid crystal layer 50 is arranged, an electric field which is parallel to the glass substrate 11 (lateral electric field) is generated. The direction of the lateral electric field is a direction orthogonal to the longitudinal direction of the slits 16a of the pixel electrode 16. The liquid crystal molecules 51 included in the liquid crystal layer 50 change in the direction of alignment in the plane parallel to the glass substrate 11 according to the magnitude of the lateral electric field.

The liquid crystal apparatus 1 in the modification 2 includes the liquid crystal panel 2 of the FFS mode as described above. In this configuration as well, the angle of visibility of the liquid crystal apparatus 1 may be widened by setting the in-plane phase difference $Re_2$, the Nz value, and the average refractive ratio Nave of the retardation film 8 to adequate values (the similar values as those in the embodiment shown above) according to the in-plane phase difference $Re_1$ and the thickness direction phase difference Rth of the protection films 6b and 7b.

The entire disclosure of Japanese Patent Application No. 2008-34073, filed Feb. 15, 2008 is expressly incorporated by reference herein.

What is claimed is:

1. A liquid crystal apparatus comprising:
a liquid crystal panel having a pair of substrates and a liquid crystal layer arranged between the pair of substrates and driven by an electric field having a component parallel to the substrates;
a first polarizing plate and a second polarizing plate arranged with the liquid crystal panel interposed therebetween, wherein each of the first and the second polarizing plates includes a polarizer and a protection film; and
a retardation film arranged between the first polarizing plate and the liquid crystal panel or between the second polarizing plate and the liquid crystal panel, wherein an in-plane phase difference ($Re_2$), an Nz value, and an average refractive ratio (Nave) of the retardation film are set to values ranging from 200 nm to 300 nm, from 0.4 to 0.8, and from 1.4 to 2.0, respectively, when an in-plane phase difference (Re1) and a thickness direction phase difference (Rth) of the protection film are set to values ranging from 0 nm to 5 nm and from 0 nm to 20 nm, respectively, to obtain a wider angle of visibility.

2. A liquid crystal apparatus comprising:
a liquid crystal panel having a pair of substrates and a liquid crystal layer arranged between the pair of substrates and driven by an electric field having a component parallel to the substrates;
a first polarizing plate and a second polarizing plate arranged with the liquid crystal panel interposed therebetween; and
a retardation film arranged between the first polarizing plate and the liquid crystal panel or between the second polarizing plate and the liquid crystal panel,
wherein the first polarizing plate and the second polarizing plate each include a polarizer and translucent protection films which interpose the polarizer, an in-plane phase difference $Re_1$ of the protection film satisfies 0 nm$\leq Re_1 \leq$5 nm, a thickness direction phase difference Rth of the protection film satisfies 20 nm$<$Rth$\leq$40 nm, an in-plane phase difference $Re_2$ of the retardation film satisfies 100 nm$\leq Re_2 \leq$150 nm, an Nz value of the retardation film satisfies 0.2$\leq$Nz$\leq$0.4, and an average refractive ratio Nave of the retardation film satisfies 1.4$\leq$Nave$\leq$2.0.

3. A liquid crystal apparatus comprising:
a liquid crystal panel having a pair of substrates and a liquid crystal layer arranged between the pair of substrates and driven by an electric field having a component parallel to the substrates;
a first polarizing plate and a second polarizing plate arranged with the liquid crystal panel interposed therebetween; and
a retardation film arranged between the first polarizing plate and the liquid crystal panel or between the second polarizing plate and the liquid crystal panel,
wherein the first polarizing plate and the second polarizing plate each include a polarizer and a translucent protection film which interpose the polarizer, an in-plane phase difference $Re_1$ of the protection film satisfies 0 nm$\leq Re_1 \leq$5 nm, a thickness direction phase difference Rth of the protection film satisfies 40 nm$<$Rth$\leq$60 nm, an in-plane phase difference $Re_2$ of the retardation film satisfies 100 nm$\leq Re_2 \leq$150 nm, an Nz value of the retardation film satisfies $-0.1\leq$Nz$<0.2$, and an average refractive ratio Nave of the retardation film satisfies 1.4$\leq$Nave$\leq$2.0.

4. The liquid crystal apparatus according to claim 1, wherein the retardation film is arranged between the liquid crystal panel and the first polarizing plate, a slow axis of the retardation film and an axis of absorption of the second polarizing plate are parallel to the direction of alignment of the liquid crystal layer, and an axis of absorption of the first polarizing plate is orthogonal to the direction of alignment of the liquid crystal layer.

5. The liquid crystal apparatus according to claim 1, wherein the retardation film is arranged between the liquid crystal panel and the second polarizing plate, the slow axis of the retardation film and an axis of absorption of the first polarizing plate are parallel to the direction of alignment of the liquid crystal layer, and an axis of absorption of the second polarizing plate is orthogonal to the direction of alignment of the liquid crystal layer.

6. The liquid crystal apparatus according to claim 1, wherein the liquid crystal panel is a liquid crystal panel of an IPS mode.

7. The liquid crystal apparatus according to claim 1, wherein the liquid crystal panel is a liquid crystal panel of an FFS mode.

8. An electronic apparatus comprising the liquid crystal according to claim 1 in a display unit.

\* \* \* \* \*